(12) United States Patent
Kobayashi

(10) Patent No.: US 11,480,774 B2
(45) Date of Patent: Oct. 25, 2022

(54) OPTICAL SYSTEM AND IMAGING APPARATUS HAVING THE SAME

(71) Applicant: CANON KABUSHIKI KAISHA, Tokyo (JP)

(72) Inventor: Kana Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 249 days.

(21) Appl. No.: 16/996,681

(22) Filed: Aug. 18, 2020

(65) Prior Publication Data

US 2021/0072505 A1   Mar. 11, 2021

(30) Foreign Application Priority Data

Sep. 5, 2019   (JP) .............................. JP2019-161981

(51) Int. Cl.
*G02B 13/00*   (2006.01)
*G02B 9/12*   (2006.01)
*H04N 5/225*   (2006.01)

(52) U.S. Cl.
CPC .............. *G02B 13/006* (2013.01); *G02B 9/12* (2013.01); *H04N 5/2254* (2013.01)

(58) Field of Classification Search
CPC ....... H04N 5/2254; G02B 9/12; G02B 13/006
USPC .......................................................... 359/754
See application file for complete search history.

(56) References Cited

U.S. PATENT DOCUMENTS

| | | | | |
|---|---|---|---|---|
| 4,838,667 A * | 6/1989 | Ueda | ..................... | G02B 15/142 359/692 |
| 9,389,398 B2 * | 7/2016 | Tsutsumi | ............... | G02B 13/04 |
| 2013/0222925 A1 | 8/2013 | Onozaki | | |
| 2014/0368926 A1 * | 12/2014 | Suzuki | ................. | G02B 13/006 359/708 |
| 2020/0132973 A1 | 4/2020 | Matsunaga | | |

FOREIGN PATENT DOCUMENTS

| | | | | |
|---|---|---|---|---|
| DE | 19651517 A1 * | 6/1997 | ........... | G02B 15/161 |
| GB | 2316764 A * | 3/1998 | ........... | G02B 15/161 |

* cited by examiner

*Primary Examiner* — James R Greece
(74) *Attorney, Agent, or Firm* — Canon U.S.A., Inc. IP Division

(57) ABSTRACT

An optical system includes a front lens group consisting of at least one lens unit that moves during focusing and having a positive refractive power, and a rear lens group consisting of a lens unit that is immobile during focusing and having a negative refractive power. The rear lens group includes at least two negative lenses and one positive lens. The front lens group and the rear lens group satisfy a predetermined inequality.

20 Claims, 13 Drawing Sheets

OPTICAL SYSTEM AND IMAGING APPARATUS HAVING THE SAME

BACKGROUND

Field of the Disclosure

The aspect of the embodiments relates to an optical system, and is suitable for a digital video camera, a digital still camera, a broadcast camera, a silver-halide-film camera, a monitoring camera, and the like.

Description of the Related Art

According to a lens having a large photographing magnification and capable of close-up photography, it is required to configure the optical system in a small size.

United States Patent Publication Application No. 20130222925 discusses an optical system consisting of a first lens unit having a positive refractive power and a second lens unit having a negative refractive power. In the optical system discussed in United States Patent Publication Application No. 20130222925, the second lens unit is fixed with respect to an image plane, and the first lens unit is extended to an object side for focusing.

SUMMARY OF THE DISCLOSURE

According to an aspect of the embodiments, an optical system includes a front lens group consisting of at least one lens unit that moves during focusing, the front lens group having a positive refractive power, and a rear lens group consisting of a lens unit that is immobile during focusing and arranged at an image side of the front lens group, the rear lens group having a negative refractive power. An interval between adjacent lens units changes during focusing. The rear lens group includes at least two negative lenses and a positive lens. The following inequalities are satisfied, $0.01 < |f1/f2| < 0.70$ and $0.00 < Dn/DL < 0.23$, and $0.95 < DL/f < 1.50$, where f1 is a focal length of the front lens group in focusing at infinity, f2 is a focal length of the rear lens group, Dn is a distance on an optical axis to an image plane from a negative lens arranged closest to an image among the at least two negative lenses in the rear lens group, DL is a distance on the optical axis to the image plane from a surface of the optical system, the surface being closest to an object in focusing at infinity, and f is a focal length of the optical system in focusing at infinity.

According to another aspect of the embodiments, an imaging apparatus includes an optical system, and an image sensor configured to photoelectrically convert an optical image formed by the optical system. The optical system includes a front lens group consisting of at least one lens unit that moves during focusing, the front lens group having a positive refractive power, and a rear lens group consisting of a lens unit that is immobile during focusing and arranged at an image side of the front lens group, the rear lens group having a negative refractive power. An interval between adjacent lens units changes during focusing. The rear lens group includes at least two negative lenses and a positive lens. The following inequalities are satisfied, $0.01 < |f1/f2| < 0.70$ and $0.00 < Dn/DL < 0.23$, and $0.95 < DL/f < 1.50$, where f1 is a focal length of the front lens group in focusing at infinity, f2 is a focal length of the rear lens group, Dn is a distance on an optical axis to an image plane from a negative lens arranged closest to an image among the negative lenses in the rear lens group, DL is a distance on the optical axis to the image plane from a surface of the optical system, the surface being closest to an object in focusing at infinity, and f is a focal length of the optical system in focusing at infinity.

Further features of the disclosure will become apparent from the following description of exemplary embodiments with reference to the attached drawings.

DESCRIPTION OF THE EMBODIMENTS

Figure 1:
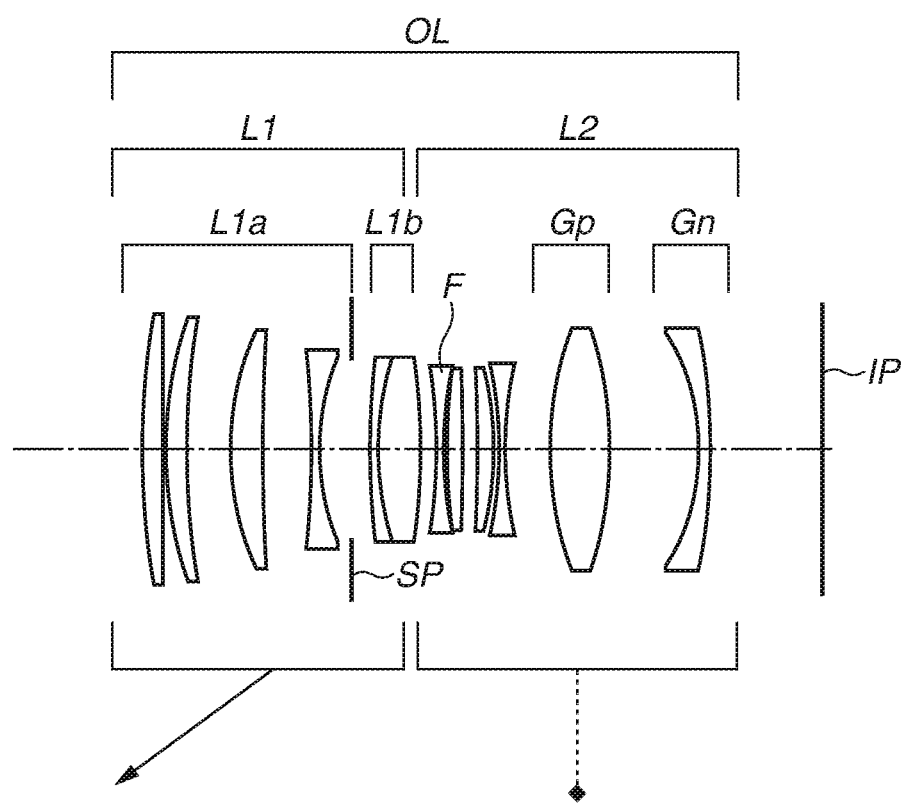
FIG. 1 is across-sectional view of an optical system according to a first exemplary embodiment.
Figure 2A:
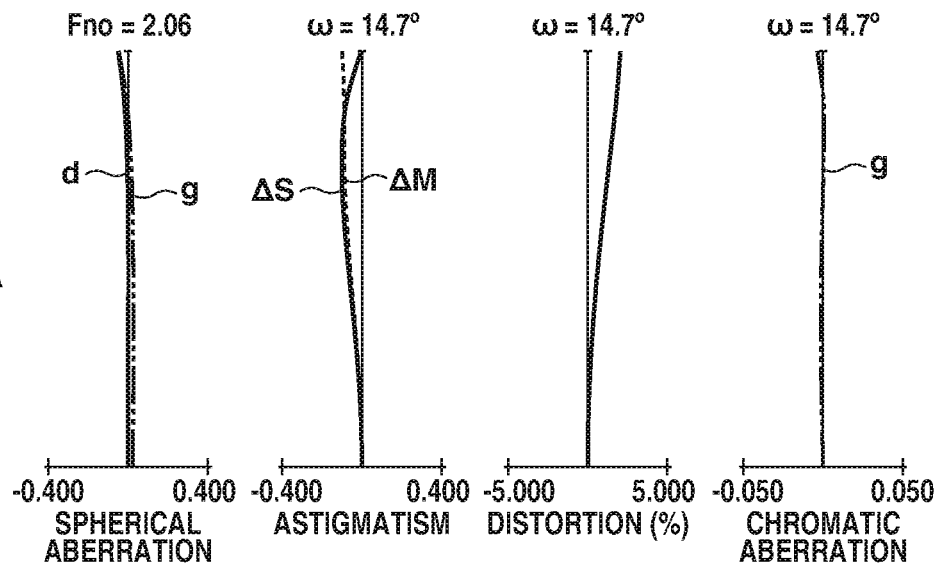
FIGS. 2A, 2B, and 2C are aberration diagrams of the optical system according to the first exemplary embodiment.
Figure 2B:
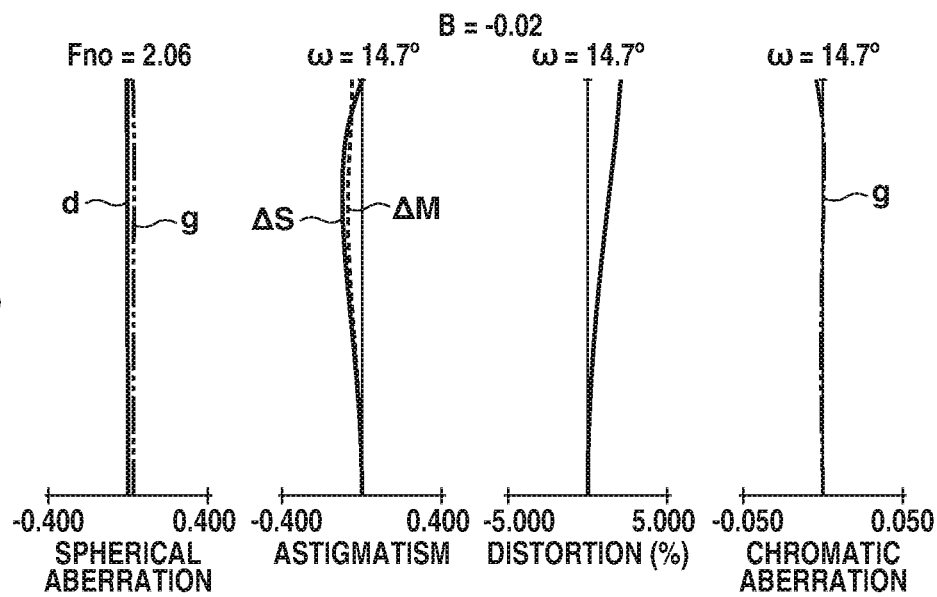
Figure 2C:
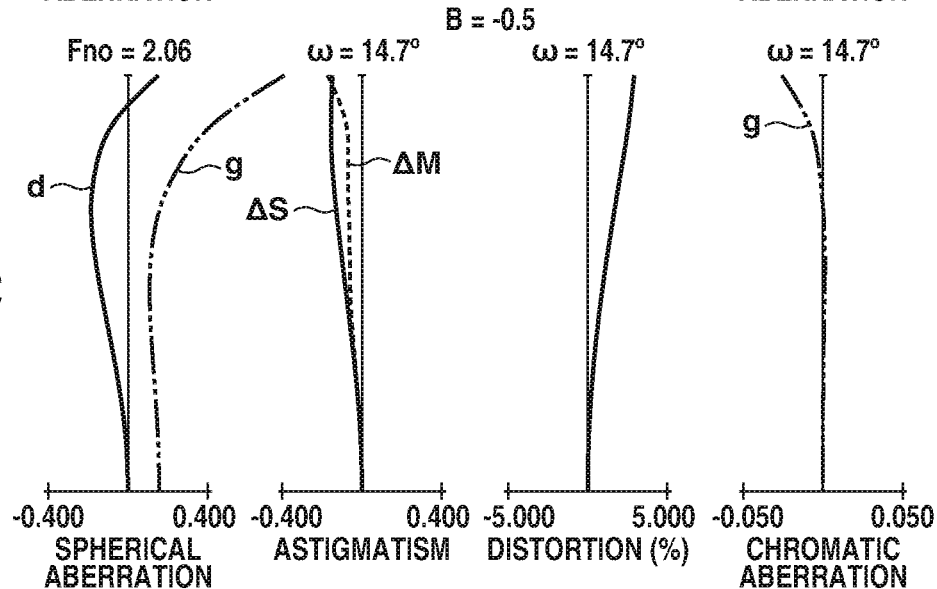
Figure 3:
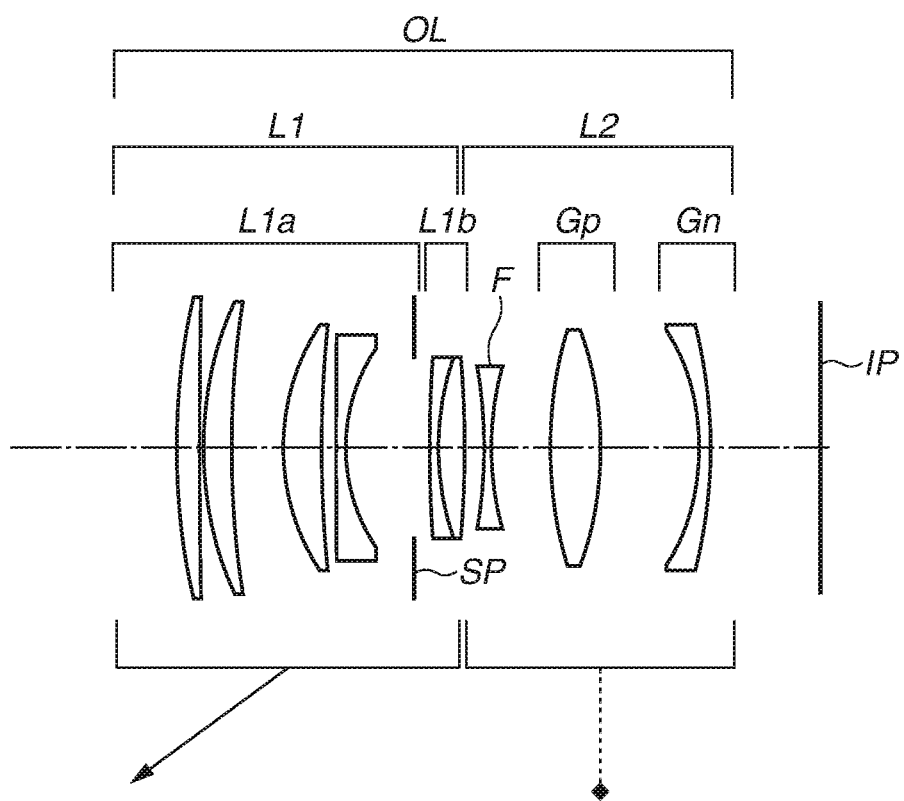
FIG. 3 is a cross-sectional view of an optical system according to a second exemplary embodiment.
Figure 4A:
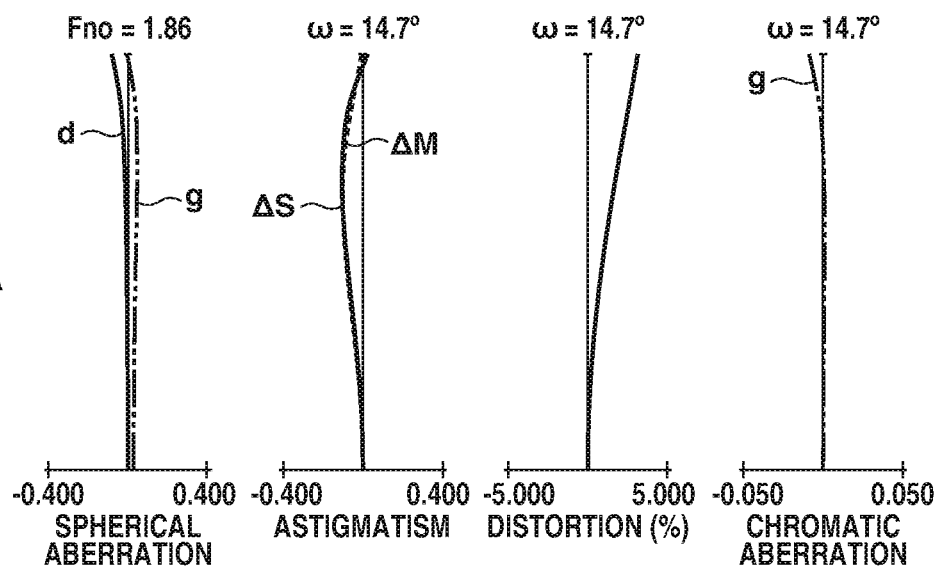
FIGS. 4A, 4B, and 4C are aberration diagrams of the optical system according to the second exemplary embodiment.
Figure 4B:
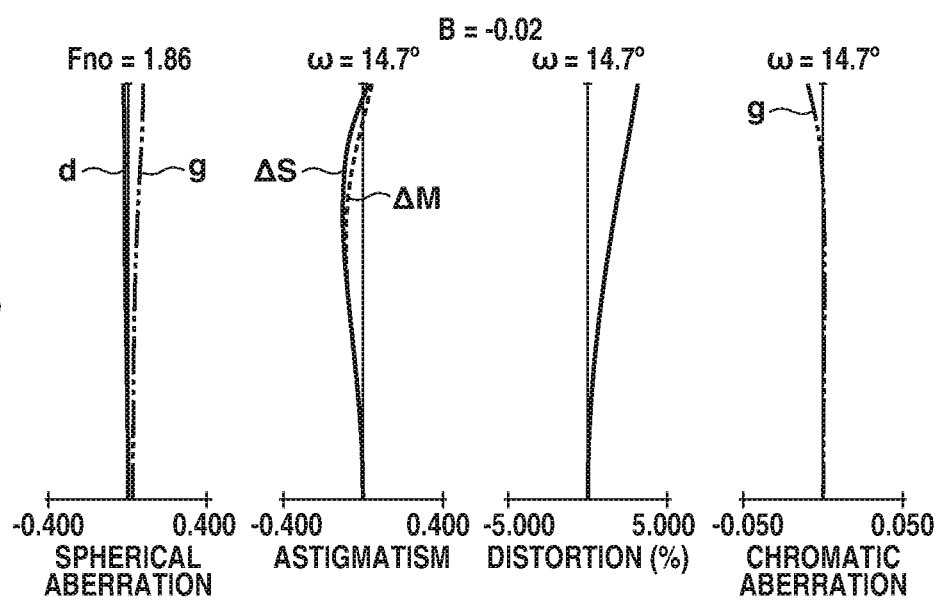
Figure 4C:
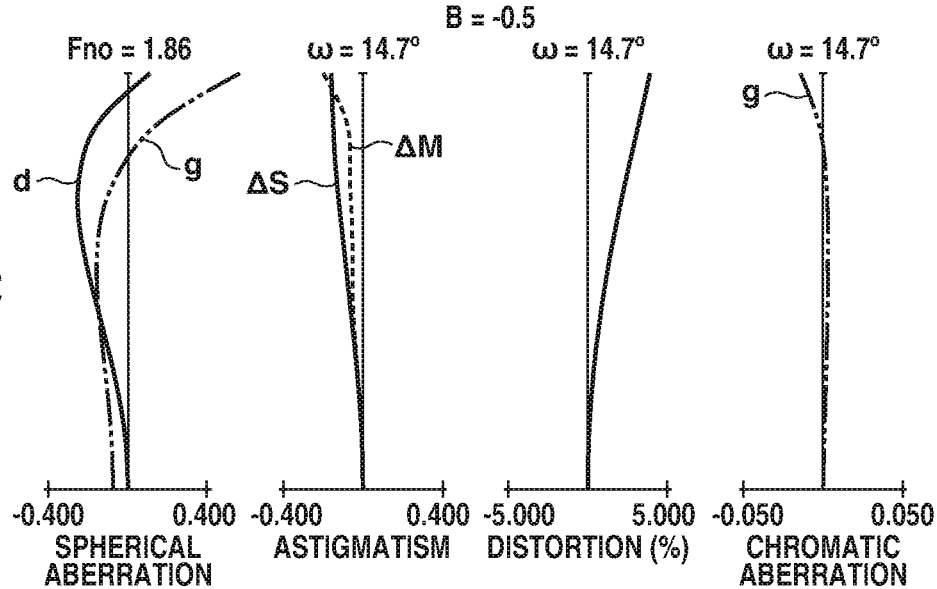
Figure 5:
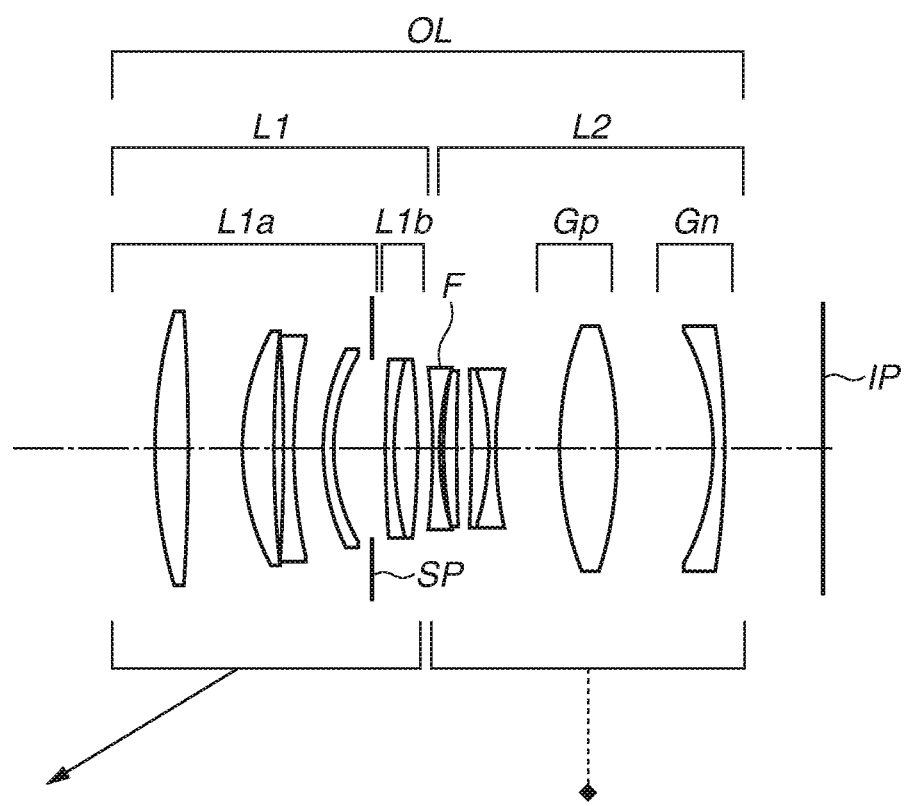
FIG. 5 is a cross-sectional view of an optical system according to a third exemplary embodiment.
Figure 6A:
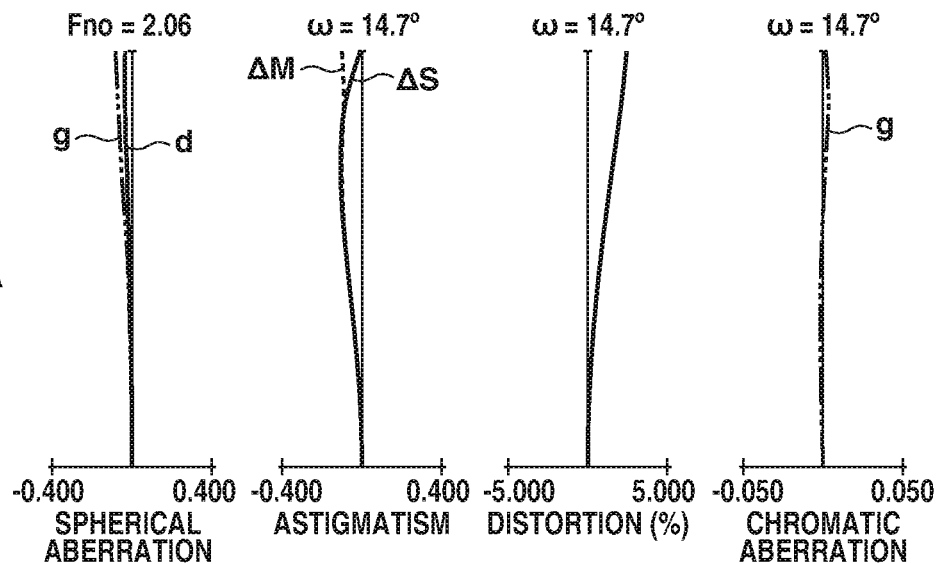
FIGS. 6A, 6B, and 6C are aberration diagrams of the optical system according to the third exemplary embodiment.
Figure 6B:
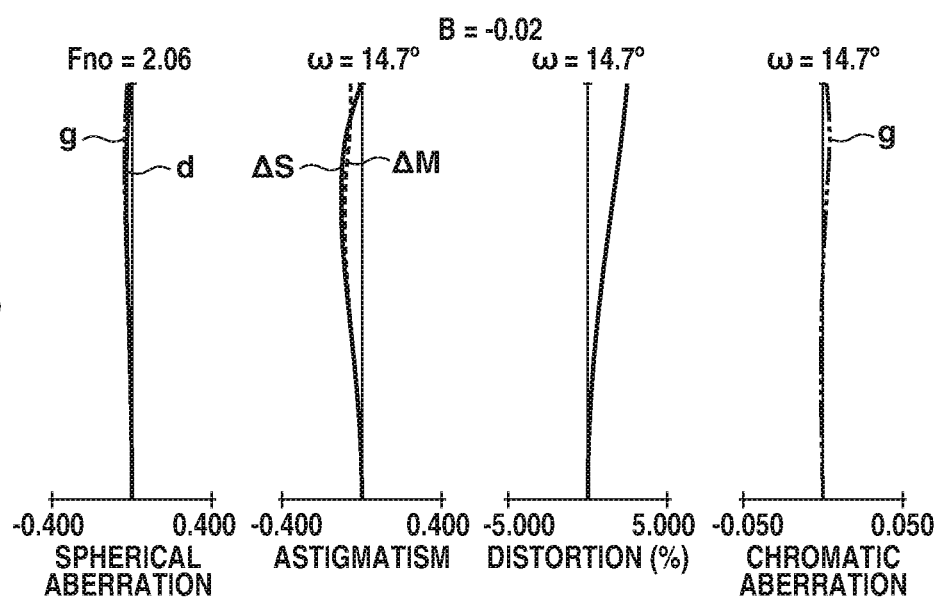
Figure 6C:
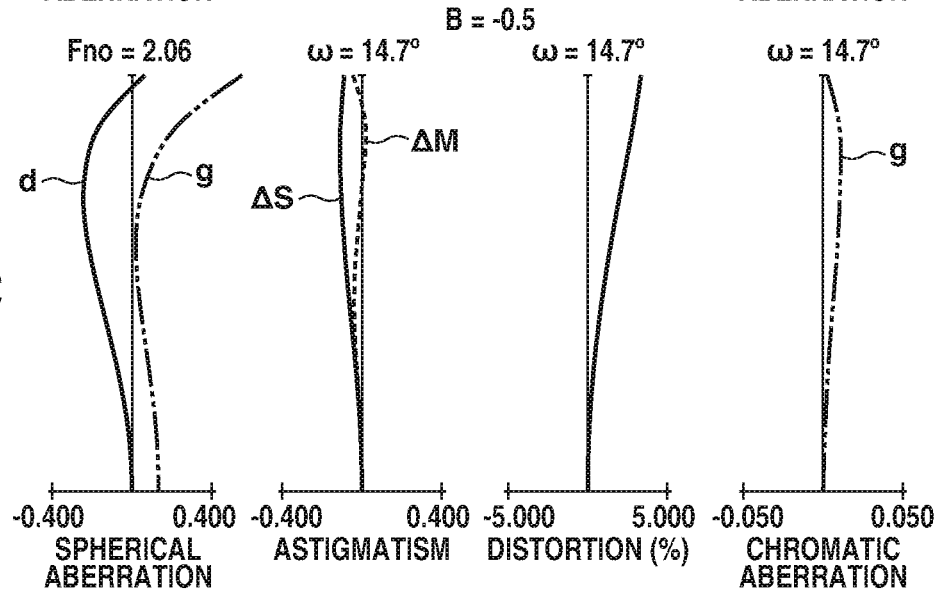
Figure 7:
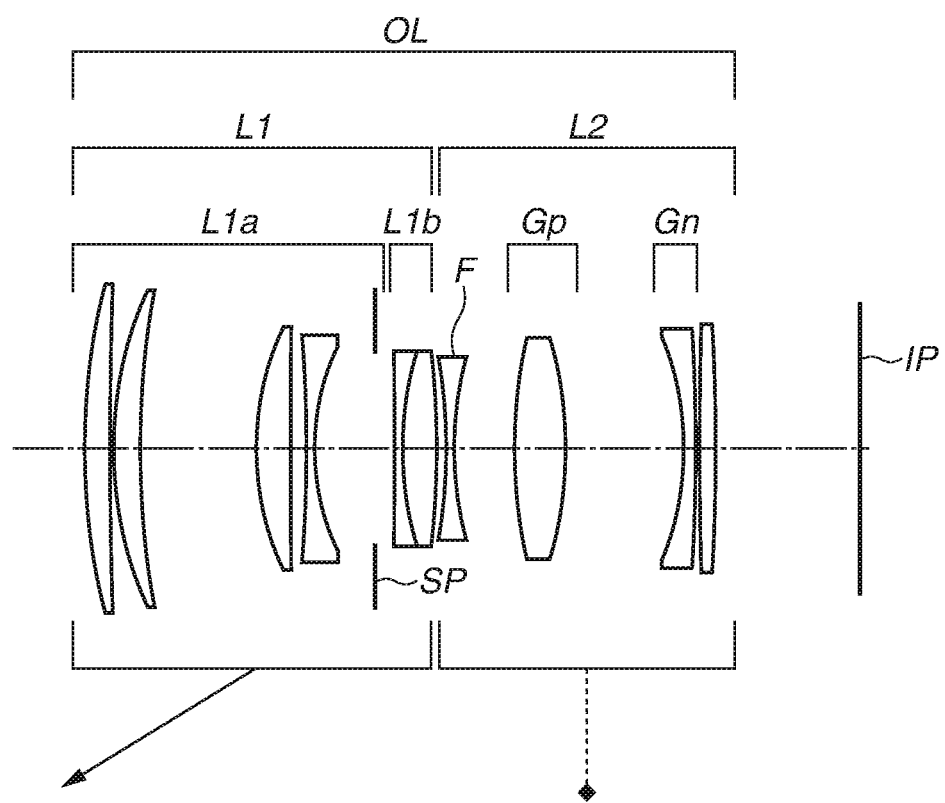
FIG. 7 is a cross-sectional view of an optical system according to a fourth exemplary embodiment.
Figure 8A:
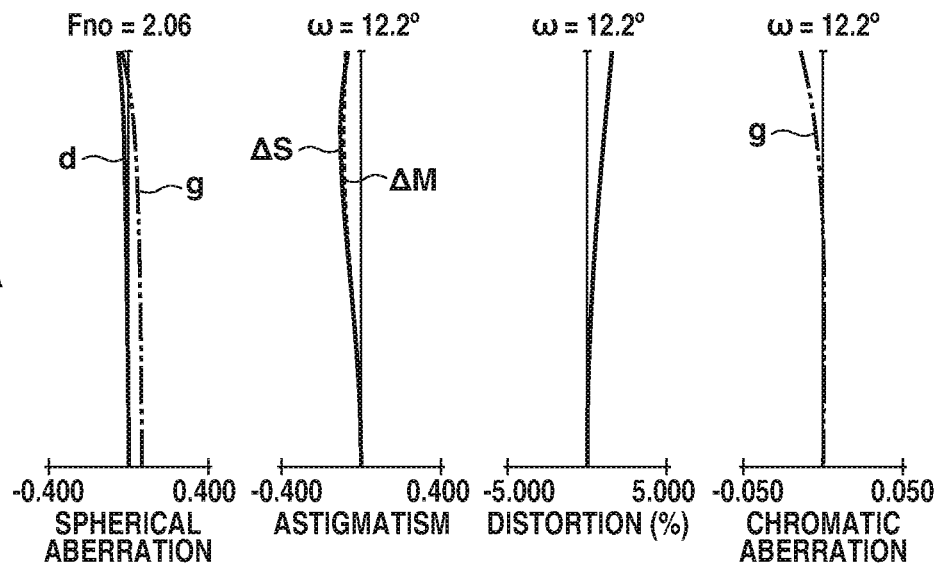
FIGS. 8A, 8B, and 8C are aberration diagrams of the optical system according to the fourth exemplary embodiment.
Figure 8B:
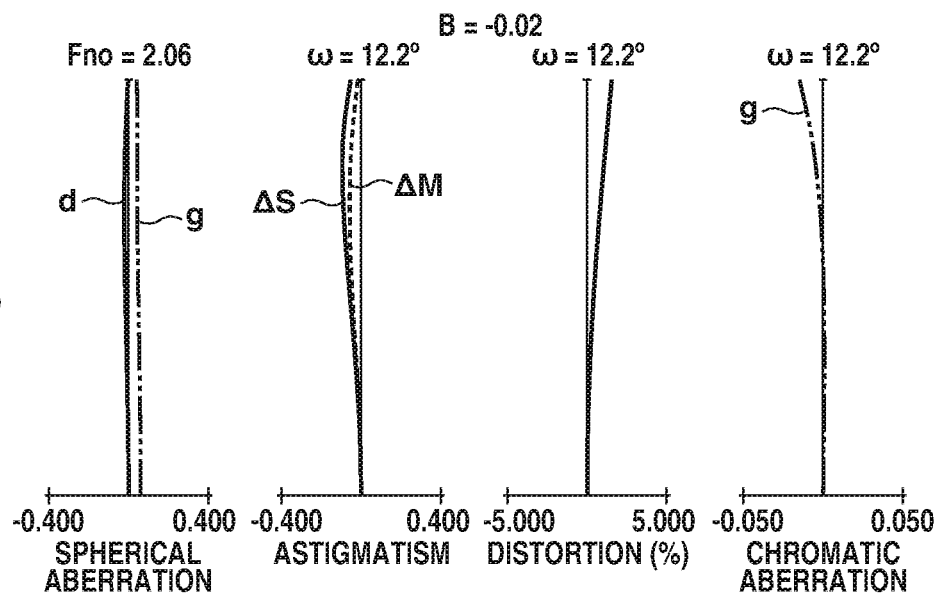
Figure 8C:
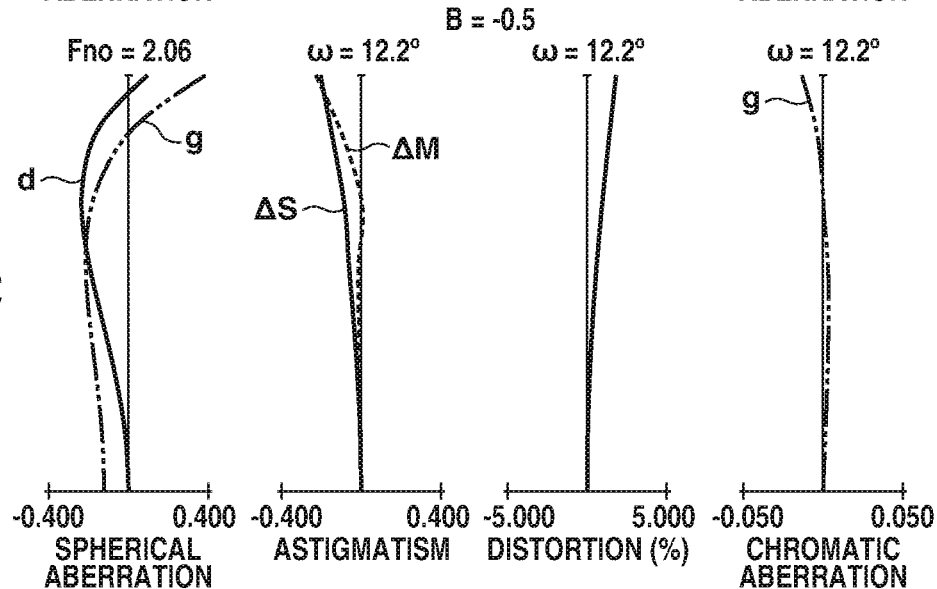
Figure 9:
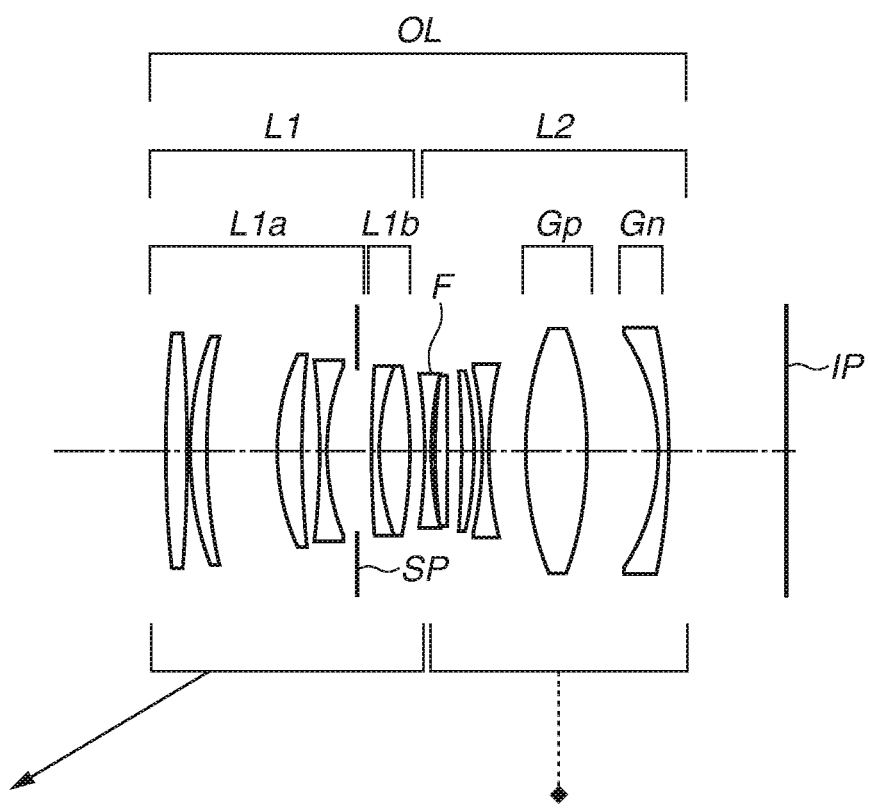
FIG. 9 is a cross-sectional view of an optical system according to a fifth exemplary embodiment.
Figure 10A:
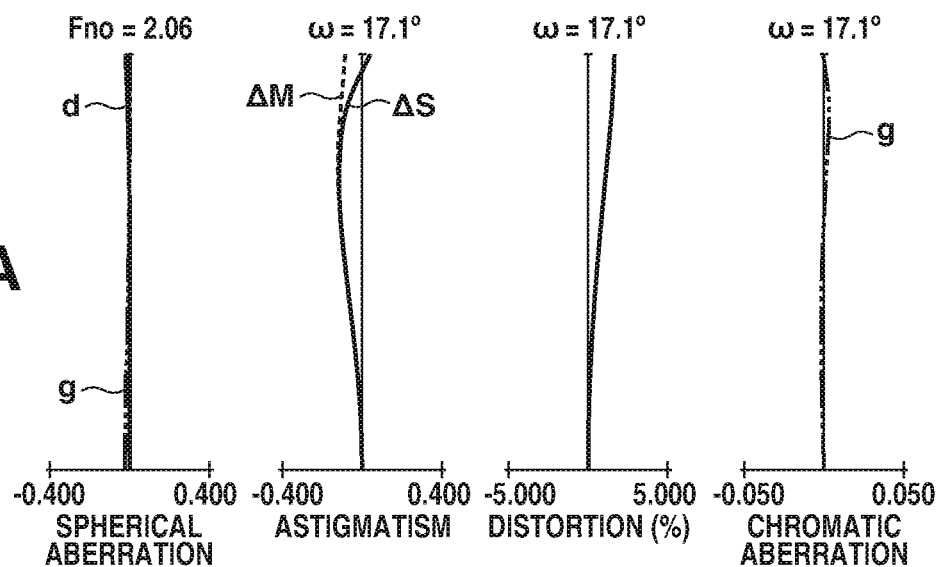
FIGS. 10A, 10B, and 10C are aberration diagrams of the optical system according to the fifth exemplary embodiment.
Figure 10B:
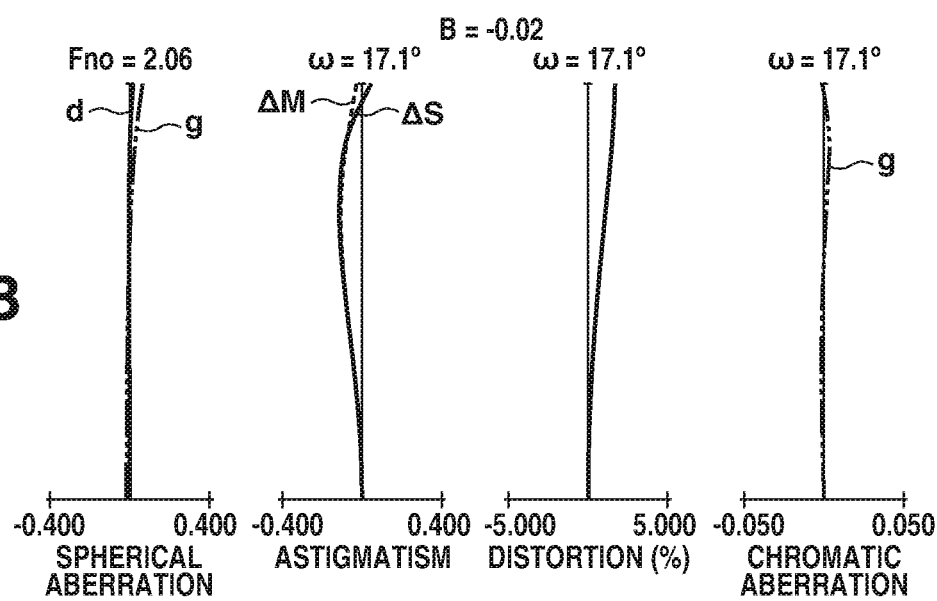
Figure 10C:
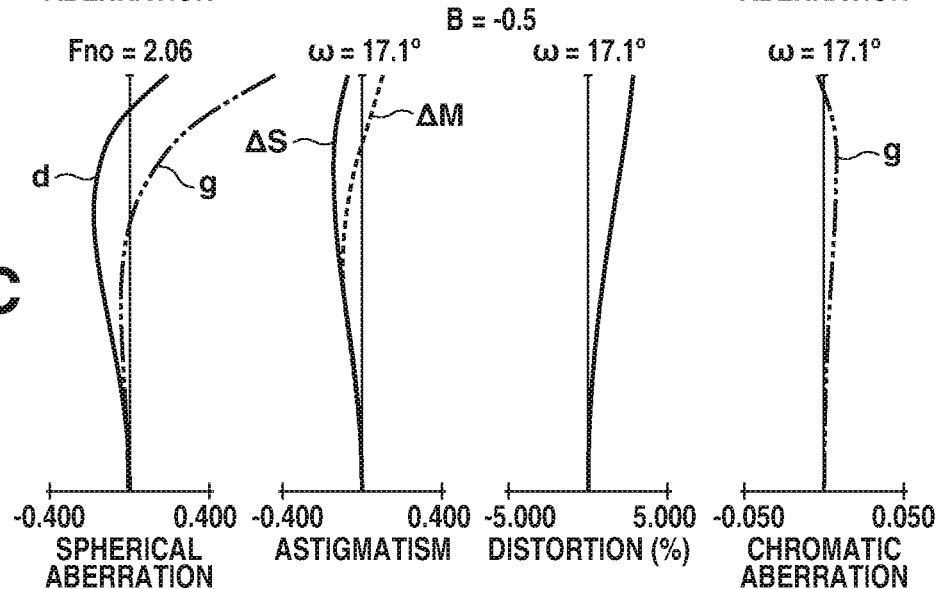
Figure 11:
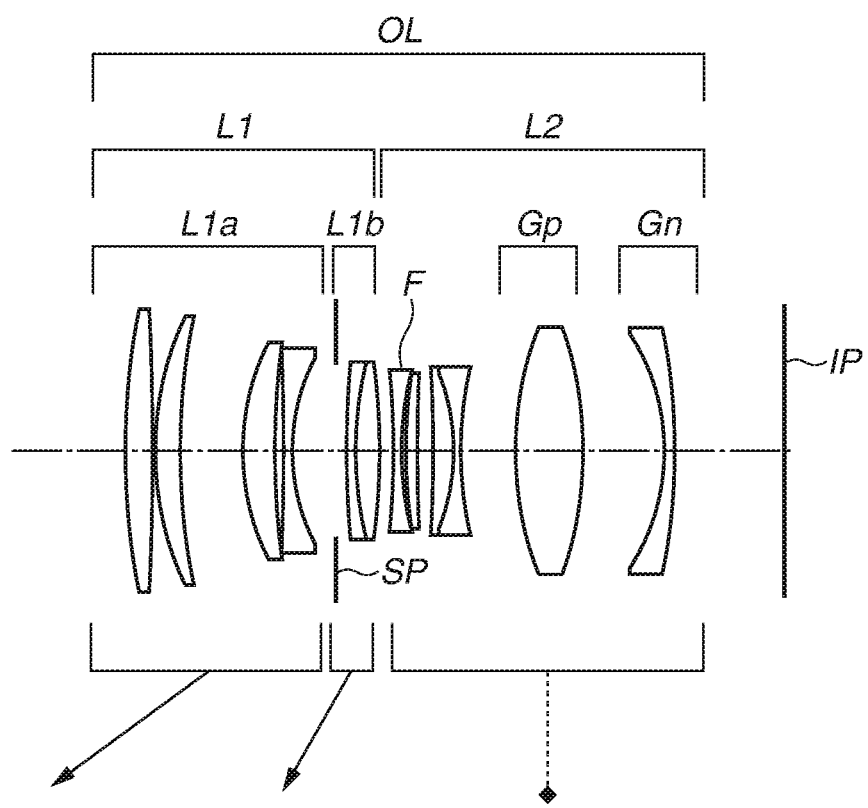
FIG. 11 is a cross-sectional view of an optical system according to a sixth exemplary embodiment.
Figure 12A:
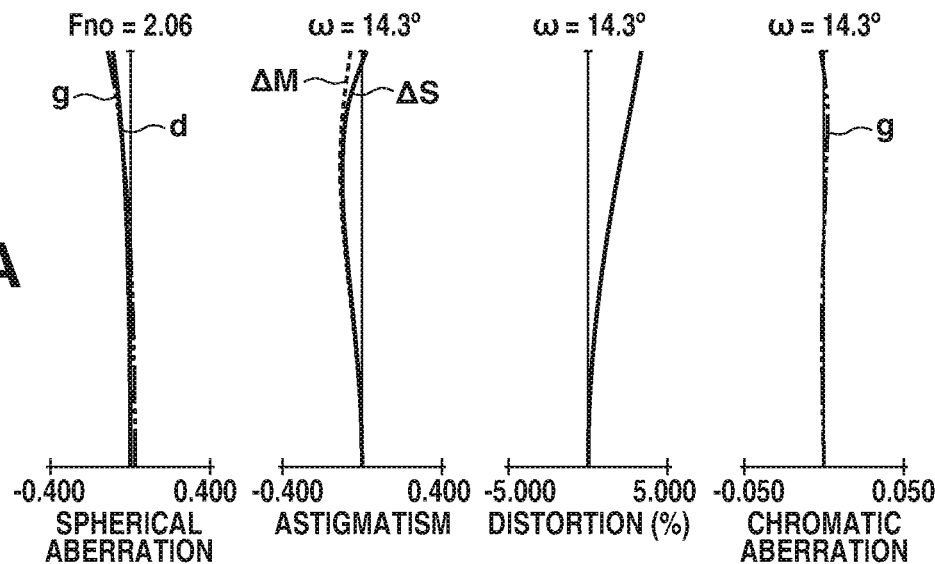
FIGS. 12A, 12B, and 12C are aberration diagrams of the optical system according to the sixth exemplary embodiment.
Figure 12B:
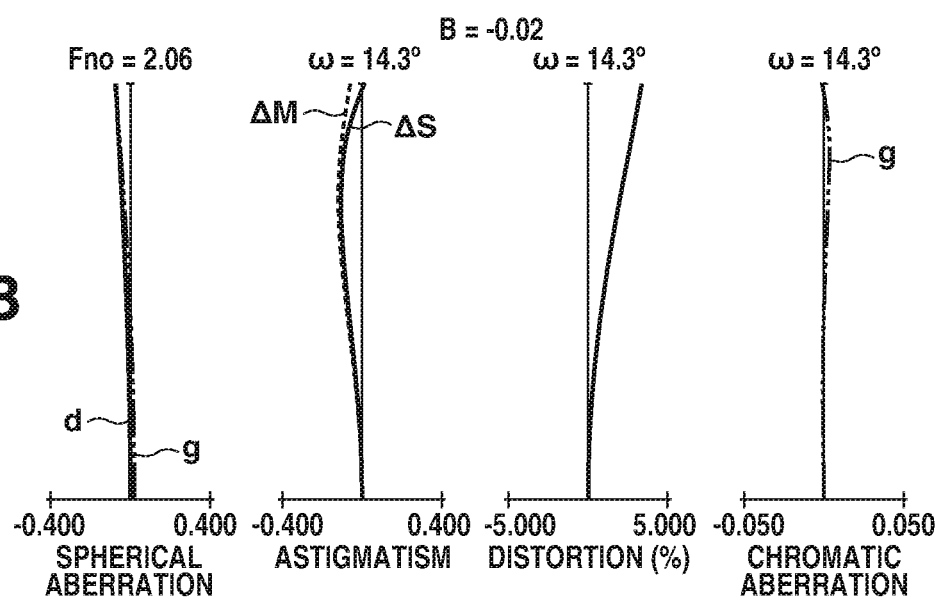
Figure 12C:
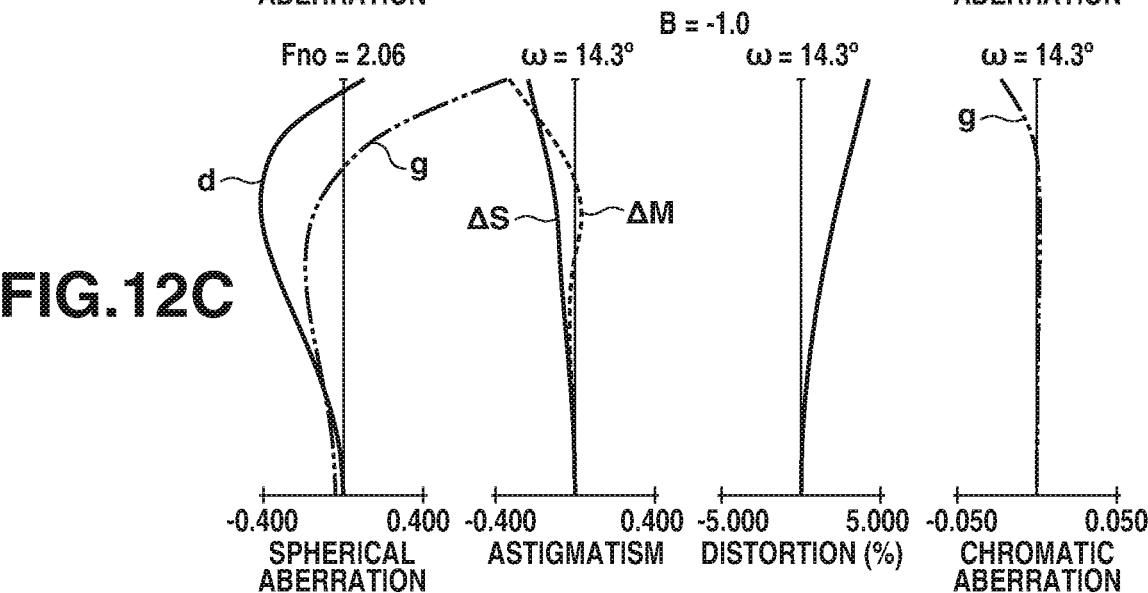

Hereinafter, an optical system according to an exemplary embodiment of the disclosure and an exemplary embodiment of an imaging apparatus including the optical system will be described with reference to the accompanying drawings.

FIGS. 1, 3, 5, 7, 9, and 11 are cross-sectional views of optical systems according to first to sixth exemplary embodiments in focusing at infinity, respectively. The optical system according to each of the exemplary embodiments is an optical system used for an imaging apparatus such as a digital video camera, a digital still camera, a broadcast camera, a silver-halide-film camera, and a monitoring camera.

In each cross-sectional view of lenses, the left side is an object side, and the right side is an image side. The optical system according to each of the exemplary embodiments is configured to have a plurality of lens units. In the specification of the present application, the lens unit refers to a group of lenses that move or stop integrally during focusing. That is, in the optical system according to each of the exemplary embodiments, the interval between adjacent lens units changes during focusing from infinity to a short distance. The lens unit can be constituted by one lens or a plurality of lenses. The lens unit can include an aperture stop.

In each cross-sectional view of lenses, a reference sign SP denotes an aperture stop that determines (limits) a light flux of an F-number (Fno). A reference sign IP denotes an image plane. When the optical system according to each of the exemplary embodiments is used as an imaging optical system for the digital still camera or the digital video camera, a solid-state image sensor (photoelectric conversion device) such as a charge-coupled device (CCD) sensor or a complementary metal oxide semiconductor (CMOS) sensor is arranged on the image plane IP as an imaging plane. When the optical system according to each of the exemplary embodiments is used as an imaging optical system for the silver-halide-film camera, a photosensitive surface corresponding to a film surface is arranged on the image plane IP.

FIGS. 2A, 2B, and 2C, FIGS. 4A, 4B, and 4C, FIGS. 6A, 6B, and 6C, FIGS. 8A, 8B, and 8C, FIGS. 10A, 10B, and 10C, and FIGS. 12A, 12B, and 12C are aberration diagrams of the optical systems according to the first to sixth exemplary embodiments, respectively. In this regard, FIGS. 2A, 4A, 6A, 8A, 10A, and 12A each illustrate aberration diagrams in focusing on an object at infinity, and FIGS. 2B, 2C, 4B, 4C, 6B, 6C, 8B, 8C, 10B, 10C, 12B, and 12C each illustrate aberration diagrams in focusing on an object at a finite distance. In FIGS. 2B, 2C, 4B, 4C, 6B, 6C, 8B, 8C, 10B, 10C, 12B, and 12C, lateral magnification is as indicated in FIGS. 2B, 2C, 4B, 4C, 6B, 6C, 8B, 8C, 10B, 10C, 12B, and 12C, respectively.

In each of the diagrams for spherical aberration, Fno represents the F-number, and indicates an amount of spherical aberration with respect to a d-line (wavelength 587.6 nm) and a g-line (wavelength 435.8 nm). In each of the astigmatism diagrams, ΔS represents an amount of astigmatism on a sagittal image plane, and ΔM represents an amount of astigmatism on a meridional image plane. Each of the diagrams for distortion aberration shows an amount of the distortion aberration with respect to the d-line. Each of the diagrams for chromatic aberration shows an amount of the chromatic aberration with respect to the g-line. In each diagram, ω represents an imaging half field angle (°).

A characteristic configuration in the optical system according to each of the exemplary embodiments will be described.

The optical system OL according to each of the exemplary embodiments consists of a front lens group L1 and a rear lens group L2. The front lens group L1 consists of one or more lens units that move during focusing, and has a positive refractive power. For example, the front lens group L1 can be composed of one lens unit that moves during focusing (see the first to fifth exemplary embodiments). Further, the front lens group L1 can be composed of two lens units that move in different tracks during focusing (see the sixth exemplary embodiment). When the front lens group L1 is composed of two or more lens units, it is only required to have a positive refractive power as a whole.

The rear lens group L2 consists of a lens unit that is immobile during focusing, and has a negative refractive power as a whole. Since the rear lens group L2 has the negative refractive power, it is possible to easily reduce an amount of movement of the lens unit in the front lens group L1 associated with focusing. Further, it is possible to easily reduce a positive Petzval sum generated by the front lens group L1, and correct the field curvature.

In general, an optical system with a large aperture ratio is likely to have difficulty in aberration correction (spherical aberration or field curvature). In addition, in an optical system where a photographing magnification becomes large at a short distance, an aberration fluctuation associated with focusing is likely to be large. In order to suppress the aberration fluctuation during focusing, it is effective to increase the number of lenses constituting the lens unit that moves during focusing, and to generate the negative spherical aberration and the Petzval sum for correction. However, when the focus lens unit is relatively arranged at the object side, the focus lens unit becomes large, which is not preferable. This is particularly noticeable when the optical system has a large aperture ratio.

Accordingly, in each of the exemplary embodiments, the rear lens group L2, which is immobile during focusing, is configured to include at least two negative lenses and one positive lens. Thus, the spherical aberration and the positive Petzval sum generated by the front lens group L1 can be easily canceled by the rear lens group L2. Therefore, it becomes possible to suppress the aberration fluctuation during focusing. As a result, even if the optical system has a large aperture ratio, it becomes easy to obtain high optical performance while suppressing the front lens group L1 from becoming excessively large.

The optical system according to each of the exemplary embodiments is configured to satisfy the following inequalities (1) and (2).

$$0.01 < |f1/f2| < 0.70 \tag{1}$$

$$0.00 < Dn/DL < 0.23 \tag{2}$$

In the expressions above, f1 denotes a focal length of the front lens group L1 in focusing at infinity, and f2 denotes a focal length of the rear lens group L2. When the front lens group L1 is composed of a plurality of lens units, f1 denotes a composite focal length of the plurality of lens units. A sign Dn denotes a distance on the optical axis to the image plane from a surface of the image side of the negative lens Gn, which is arranged closest to an image among the negative lenses included in the rear lens group L2. A sign DL denotes a total length of the optical system OL in focusing at infinity. The total length of the optical system OL is a distance on the optical axis to the image plane from the surface of the lens arranged closest to an object in the optical system OL. In a case where an optical material composed of a face plate or a parallel plate such as an optical filter is arranged between a final lens surface and the image plane, values obtained by air converting the thickness of the optical material are used as the values for Dn and DL.

The inequality (1) defines a relationship between the focal lengths of the front lens group L1 and the rear lens group L2. In exceeding the upper limit of the inequality (1), the absolute value of the focal length of the rear lens group L2 becomes too small, and therefore, it becomes difficult to suppress the aberration fluctuation during focusing. In falling below the lower limit value of the inequality (1), the absolute value of the focal length of the rear lens group L2 becomes too large, and therefore, it becomes difficult to configure the optical system OL in a small size.

The numerical range of the inequality (1) is preferably in a range of the inequality (1a), and more preferably in a range of the inequality (1b), as below.

$$0.10 < |f1/f2| < 0.60 \tag{1a}$$

$$0.20 < |f1/f2| < 0.43 \tag{1b}$$

The inequality (2) defines a relationship between the total length of the optical system OL and the position of the negative lens Gn arranged closest to an image in the rear lens group L2 in focusing at infinity. In exceeding the upper limit of the inequality (2), a height of an off-axis light flux in the negative lens Gn becomes low, and therefore, it becomes difficult to correct the field curvature.

In a case where the negative lens Gn is too close to the image plane IP (in a case where the value of Dn/DL is too small), an incident angle to an image sensor arranged on the image plane IP becomes too large. Therefore, a lower limit value can be set for the value of Dn/DL. The numerical range of the inequality (2) is in a range of the inequality (2a), and more preferably in a range of the inequality (2b), as below.

$$0.05 < Dn/DL < 0.22 \quad (2a)$$

$$0.10 < Dn/DL < 0.19 \quad (2b)$$

With the above configuration, the optical system OL according to each of the exemplary embodiments can achieve high optical performance while it is small in size.

A preferable configuration that is to be satisfied in the optical system OL according to each of the exemplary embodiments will be described.

In the optical system OL according to each of the exemplary embodiments, it is preferable to provide the aperture stop SP in the front lens group L1. This allows to more easily reduce the size of the front lens group L1, and for example, allows to perform more rapid focusing.

In the optical system OL according to each of the exemplary embodiments, it is preferable to provide the positive lens closest to an object. In a telephoto type optical system with a large aperture ratio as in the optical system OL according to each of the exemplary embodiments, the positive lens is arranged closest to an object to sufficiently converge an on-axis light flux. Therefore, it becomes easy to reduce an effective aperture of the lens arranged at the image side. This facilitates the miniaturization of the optical system OL.

As in the optical system OL according to each of the exemplary embodiments, it is preferable to arrange a lens element F having a negative refractive power closest to an object in the rear lens group L2. In the present specification, the lens element refers to a single lens element or a cemented lens. That is, it is preferable that the rear lens group L2 in the optical system OL according to each of the exemplary embodiments has a single lens element with a negative refractive power or a cemented lens with a negative refractive power, which is arranged closest to an object. This allows to more easily suppress the change of aberration regarding off-axis aberration, such as the field curvature or the distortion aberration, during focusing.

It is sufficient that the front lens group L1 according to each of the exemplary embodiments is composed of one or more lens units that move during focusing. More preferably, the front lens group L1 is composed of one lens unit. That is, it is preferable that the front lens group L1 moves integrally along the optical axis during focusing. This allows to easily simplify the focus mechanism while obtaining sufficient optical performance.

In the optical system OL according to each of the exemplary embodiments, it is preferable that the front lens group L1 has at least one positive lens and one negative lens at the image side of the aperture stop SP. This allows to more easily correct the change of the spherical aberration or the field curvature during focusing.

It is preferable that the optical system OL according to each of the exemplary embodiments satisfies at least one of the following inequalities.

$$0.00 < |f1/f2| < 1.00 \quad (3)$$

$$|\beta| > 0.30 \quad (4)$$

$$0.30 < f1/f < 1.00 \quad (5)$$

$$0.30 < Da/DL < 0.90 \quad (6)$$

$$0.00 < f2p/f < 0.80 \quad (7)$$

$$0.05 < f1a/f1b < 8.00 \quad (8)$$

$$0.01 < skd/DL < 0.40 \quad (9)$$

$$0.05 < |fn/f| < 1.20 \quad (10)$$

$$0.95 < DL/f < 1.50 \quad (11)$$

In the expressions above, f denotes a focal length of the optical system in focusing at infinity. The sign β denotes image magnification (lateral magnification) of the optical system OL in focusing at a shortest distance. The sign Da denotes a distance on the optical axis from the aperture stop SP to the image plane in focusing on an object at infinity. The sign f2p denotes a focal length of the positive lens Gp arranged adjacent to the negative lens Gn at the object side. The sign f1a denotes a focal length of a first part optical system L1a arranged at the object side from the aperture stop SP in the front lens group L1. The sign f1b denotes a focal length of a second part optical system L1b arranged at the image side from the aperture stop SP in the front lens group L1. The sign skd denotes a distance from the lens surface closest to an image to the image plane IP in focusing at infinity. The sign fn denotes a focal length of the negative lens Gn. In a case where the optical material composed of the face plate or the parallel plate such as the optical filter is arranged between the lens surface closest to an image and the image plane, the values obtained by air-converting the thickness of the optical material are used as the values of Da and skd.

The inequality (3) defines the relationship between the focal length f2 of the rear lens group L2 and the focal length f of the optical system OL. In exceeding the upper limit of the inequality (3), the absolute value of the focal length of the rear lens group L2 becomes too small, and therefore, it becomes difficult to sufficiently suppress the aberration fluctuation during focusing. In falling below the lower limit of the inequality (3), the absolute value of the focal length of the rear lens group L2 becomes too large, and therefore, it becomes difficult to configure the entire optical system OL system to be sufficiently small.

The inequality (4) defines the image magnification (lateral magnification) in focusing on the closest object point. By satisfying the inequality (4), it is possible to perform sufficient short-range imaging.

The inequality (5) defines the relationship between the focal length f of the optical system OL and the focal length f1 of the front lens group L1. In exceeding the upper limit of the inequality (5), a refractive power of the front lens group L1 becomes too weak, and an extension amount of the front lens group L1 associated with focusing becomes too large. Therefore, it is difficult to sufficiently miniaturize the optical system OL. In falling below the lower limit of the inequality (5), the refractive power of the front lens group L1 becomes too large, and therefore, it becomes difficult to sufficiently suppress the aberration fluctuation associated with focusing.

The inequality (6) defines the relationship between the distance DL on the optical axis from the lens surface of the optical system OL closest to an object to the image plane IP and the distance Da on the optical axis from the aperture stop SP to the image plane IP. In exceeding the upper limit of the inequality (6), the height of the on-axis light flux passing through the aperture stop SP becomes high, and the maximum diameter of the aperture stop SP becomes too large. As a result, it becomes difficult to sufficiently miniaturize the optical system OL. In falling below the lower limit of the inequality (6), it becomes difficult to secure a sufficient amount of light even when the aperture stop SP is narrowed down over the focus range from infinity to a short distance.

The inequality (7) defines the focal length f2p of the positive lens Gp arranged adjacent to the negative lens Gn at the object side with respect to the focal length f of the entire lens system. In exceeding the upper limit of the inequality (7), the refractive power of the positive lens Gp becomes too weak, and therefore, it becomes difficult to correct magnification chromatic aberration or the distortion aberration, which is not preferable. It is preferable to set a lower limit value to the value of f2p/f, as in inequalities (7a) and (7b) described below. This allows optimization of the value of f2p, and suppresses an excessive correction of the magnification chromatic aberration and the distortion aberration.

The inequality (8) defines the relationship between the focal length f1a of the first part optical system L1a and the focal length f1b of the second part optical system L1b. In exceeding the upper limit of the inequality (8), the refractive power of the first part optical system L1a becomes too weak, and therefore, the effect of converging the on-axis light flux weakens. As a result, it becomes insufficient to minimize the second part optical system L1b, and it becomes difficult to configure the front lens group L1 to be sufficiently compact. In falling below the lower limit of the inequality (8), the refractive power of the first part optical system L1a becomes too strong, and therefore, it becomes difficult to sufficiently suppress the aberration fluctuation associated with focusing.

The inequality (9) defines the relationship between back focus skd and the distance DL on the optical axis to the image plane IP from the lens surface of the optical system OL closest to an object in focusing at infinity. When the back focus becomes long enough to exceed the upper limit of the inequality (9), it is impossible to arrange the lens near the image plane IP, and therefore, it becomes difficult to sufficiently correct the off-axis aberration. When the back focus becomes short enough to fall below the lower limit of the inequality (9), a diameter of the lens arranged closest to an image in the optical system OL becomes too large, and therefore, it becomes difficult to sufficiently minimize the optical system OL.

The inequality (10) defines the relationship between the focal length f of the optical system OL and the focal length fn of the negative lens Gn arranged closest to an image in the rear lens group L2. In exceeding the upper limit of the inequality (10), the refractive power of the negative lens Gn becomes too weak, and therefore, it becomes difficult to sufficiently correct the Petzval sum and reduce the field curvature. In falling below the lower limit of the inequality (10), the refractive power of the negative lens Gn becomes too strong, and therefore, the incident angle to the image sensor arranged on the image plane IP becomes too large.

The inequality (11) defines the relationship between the focal length f of the optical system OL and the distance DL on the optical axis to the image plane IP from the lens surface of the optical system OL closest to an object in focusing at infinity. In exceeding the upper limit of the inequality (11), the total length becomes too long, and therefore, it becomes difficult to configure the optical system OL to be sufficiently small. In falling below the lower limit of the inequality (11), while it is advantageous for minimizing, it becomes difficult to sufficiently correct the spherical aberration and the on-axis chromatic aberration, especially.

It is preferable that numerical ranges of the inequalities (3) to (11) are set to be the ranges of the following inequalities (3a) to (11a).

$$0.20 < |f1/f2| < 0.80 \tag{3a}$$

$$|\beta| > 0.40 \tag{4a}$$

$$0.50 < f1/f < 0.95 \tag{5a}$$

$$0.50 < Da/DL < 0.80 \tag{6a}$$

$$0.20 < f2p/f < 0.50 \tag{7a}$$

$$1.00 < f1a/f1b < 6.00 \tag{8a}$$

$$0.10 < skd/DL < 0.30 \tag{9a}$$

$$0.10 < |fn/f| < 1.00 \tag{10a}$$

$$1.00 < DL/f < 1.40 \tag{11a}$$

It is more preferable that the numerical ranges of the inequalities (3) to (11) are set to the ranges of the following inequalities (3b) to (11b).

$$0.30 < |f/f2| < 0.70 \tag{3b}$$

$$|\beta| > 0.45 \tag{4b}$$

$$0.65 < f1/f < 0.90 \tag{5b}$$

$$0.60 < Da/DL < 0.70 \tag{6b}$$

$$0.30 < f2p/f < 0.48 \tag{7b}$$

$$1.20 < f1a/f1b < 5.00 \tag{8b}$$

$$0.12 < skd/DL < 0.25 \tag{9b}$$

$$0.30 < |fn/f| < 0.98 \tag{10b}$$

$$1.05 < DL/f < 1.35 \tag{11b}$$

First to sixth numerical examples corresponding to the first to sixth exemplary embodiments are shown below.

In surface data of each of the numerical examples, r represents a curvature radius of each of the optical surfaces, and d (mm) represents an on-axis interval (distance on the optical axis) between the m-th surface and the (m+1)-th surface. The sign m represents the number of the surface counted from the light incident side. The sign nd represents a refractive index with respect to the d-line of each of the optical members, and the sign vd represents the Abbe constant of the optical member.

In each of the numerical examples, the values of d, focal length (mm), F-number, and half field angle (°) are all the values when the optical system according to each of the exemplary embodiments focuses on an object at infinity. The back focus BF represents a distance from the final lens surface to the image plane. The overall lens length represents a value obtained by adding the back focus to a distance from a first lens surface to the final lens surface.

First Numerical Example

Unit: mm

Surface Data

| surface number | r | d | nd | vd |
|---|---|---|---|---|
| 1 | 114.175 | 3.19 | 1.60311 | 60.6 |
| 2 | 2010.098 | 0.50 | | |
| 3 | 61.533 | 3.20 | 1.60311 | 60.6 |
| 4 | 122.660 | 6.60 | | |
| 5 | 42.821 | 5.01 | 1.49700 | 81.5 |
| 6 | 272.642 | 7.50 | | |
| 7 | −147.348 | 1.30 | 1.68893 | 31.1 |
| 8 | 37.962 | 4.90 | | |
| 9 (aperture stop) | ∞ | 2.86 | | |
| 10 | 114.201 | 1.30 | 1.84666 | 23.8 |
| 11 | 46.967 | 6.40 | 1.90043 | 37.4 |
| 12 | −90.592 | (variable) | | |
| 13 | −78.073 | 1.15 | 1.72047 | 34.7 |
| 14 | 57.128 | 0.49 | | |
| 15 | 86.252 | 2.39 | 1.80400 | 46.5 |
| 16 | −333.048 | 2.22 | | |
| 17 | −284.806 | 2.58 | 1.92286 | 20.9 |
| 18 | −51.857 | 0.85 | | |
| 19 | −57.965 | 0.94 | 1.83400 | 37.2 |
| 20 | 57.965 | 6.96 | | |
| 21 | 52.408 | 9.02 | 1.83481 | 42.7 |
| 22 | −63.153 | 13.69 | | |
| 23 | −34.104 | 1.70 | 1.84666 | 23.8 |
| 24 | −95.879 | 17.60 | | |
| image plane | ∞ | | | |

| | |
|---|---|
| focal length | 82.45 |
| F-number | 2.06 |
| half field angle (°) | 14.70 |
| image height | 21.64 |
| overall lens length | 104.87 |
| BF | 17.60 |

| imaging magnification | infinity | −0.02 times | −0.5 times |
|---|---|---|---|
| d12 | 2.52 | 3.60 | 29.52 |

Lens Unit Data

| unit | starting surface | focal length |
|---|---|---|
| 1 | 1 | 66.73 |
| 2 | 13 | −165.06 |

Second Numerical Example

Unit: mm

Surface Data

| surface number | r | d | nd | vd |
|---|---|---|---|---|
| 1 | 103.406 | 3.50 | 1.65160 | 58.5 |
| 2 | 1155.186 | 0.50 | | |
| 3 | 52.833 | 4.34 | 1.49700 | 81.5 |
| 4 | 140.084 | 7.96 | | |
| 5 | 34.258 | 5.88 | 1.59522 | 67.7 |
| 6 | 189.230 | 2.21 | | |
| 7 | 1168.433 | 1.50 | 1.69895 | 30.1 |
| 8 | 28.297 | 10.57 | | |
| 9 (aperture stop) | ∞ | 2.29 | | |
| 10 | 230.601 | 1.30 | 1.72047 | 34.7 |
| 11 | 43.406 | 3.90 | 1.90043 | 37.4 |
| 12 | −159.612 | (variable) | | |
| 13 | −72.800 | 1.15 | 1.72916 | 54.7 |
| 14 | 43.884 | 8.88 | | |
| 15 | 60.674 | 7.82 | 1.80400 | 46.5 |
| 16 | −51.099 | 15.13 | | |
| 17 | −33.223 | 1.70 | 1.84666 | 23.8 |
| 18 | −69.220 | 16.84 | | |
| image plane | ∞ | | | |

| | |
|---|---|
| focal length | 82.48 |
| F-number | 1.86 |
| half field angle (°) | 14.70 |
| image height | 21.64 |
| overall lens length | 98.50 |
| BF | 16.84 |

| imaging magnification | infinity | −0.02 times | −0.5 times |
|---|---|---|---|
| d12 | 3.01 | 4.09 | 30.01 |

Lens Unit Data

| unit | starting surface | focal length |
|---|---|---|
| 1 | 1 | 66.74 |
| 2 | 13 | −206.88 |

Third Numerical Example

Unit: mm

Surface Data

| surface number | r | d | nd | vd |
|---|---|---|---|---|
| 1 | 73.246 | 5.05 | 1.61800 | 63.4 |
| 2 | −323.325 | 8.35 | | |
| 3 | 38.289 | 4.78 | 1.59522 | 67.7 |
| 4 | 155.410 | 1.45 | | |
| 5 | −350.261 | 1.60 | 1.72047 | 34.7 |
| 6 | 72.603 | 4.54 | | |
| 7 | 35.545 | 1.50 | 1.74077 | 27.8 |
| 8 | 28.338 | 5.81 | | |
| 9 (aperture stop) | ∞ | 2.29 | | |
| 10 | 261.773 | 1.30 | 1.76182 | 26.5 |
| 11 | 57.934 | 3.42 | 1.83481 | 42.7 |
| 12 | −113.211 | (variable) | | |
| 13 | −131.680 | 1.15 | 1.74077 | 27.8 |
| 14 | 40.684 | 0.57 | | |
| 15 | 57.027 | 2.03 | 2.00100 | 29.1 |
| 16 | 302.963 | 2.19 | | |
| 17 | −349.896 | 2.82 | 1.92286 | 20.9 |
| 18 | −36.156 | 1.00 | 1.80100 | 35.0 |
| 19 | 54.226 | 9.74 | | |
| 20 | 52.403 | 8.81 | 1.77250 | 49.6 |
| 21 | −64.021 | 14.70 | | |
| 22 | −37.641 | 1.75 | 1.84666 | 23.8 |
| 23 | −112.295 | 14.92 | | |
| image plane | ∞ | | | |

| | |
|---|---|
| focal length | 82.50 |
| F-number | 2.06 |
| field angle | 14.69 |
| image height | 21.64 |
| overall lens length | 102.08 |
| BF | 14.92 |

| imaging magnification | infinity | −0.02 times | −0.5 times |
|---|---|---|---|
| d12 | 2.29 | 3.30 | 27.46 |

-continued

Unit: mm

Lens Unit Data

| unit | starting surface | focal length |
|---|---|---|
| 1 | 1 | 64.44 |
| 2 | 13 | −154.72 |

Fourth Numerical Example

Unit: mm

Surface Data

| surface number | r | d | nd | vd |
|---|---|---|---|---|
| 1 | 95.263 | 3.83 | 1.65160 | 58.5 |
| 2 | 649.651 | 0.60 | | |
| 3 | 57.682 | 4.08 | 1.49700 | 81.5 |
| 4 | 132.836 | 17.77 | | |
| 5 | 42.816 | 5.23 | 1.49700 | 81.5 |
| 6 | 1608.281 | 2.27 | | |
| 7 | −249.792 | 1.40 | 1.69895 | 30.1 |
| 8 | 35.205 | 9.28 | | |
| 9 (aperture stop) | ∞ | 2.76 | | |
| 10 | 1240.892 | 1.40 | 1.59551 | 39.2 |
| 11 | 49.699 | 5.11 | 1.90043 | 37.4 |
| 12 | −136.360 | (variable) | | |
| 13 | −81.577 | 1.24 | 1.72047 | 34.7 |
| 14 | 53.156 | 9.26 | | |
| 15 | 74.049 | 7.70 | 1.80610 | 33.3 |
| 16 | −59.784 | 18.10 | | |
| 17 | −44.830 | 1.84 | 1.84666 | 23.8 |
| 18 | −305.078 | 0.50 | | |
| 19 | 400.000 | 2.51 | 2.00100 | 29.1 |
| 20 | −326.852 | 21.99 | | |
| image plane | ∞ | | | |

| | |
|---|---|
| focal length | 99.80 |
| F-number | 2.06 |
| half field angle (°) | 12.23 |
| image height | 21.64 |
| overall lens length | 118.38 |
| BF | 21.99 |

| imaging magnification | infinity | −0.02 times | −0.5 times |
|---|---|---|---|
| d12 | 1.50 | 2.82 | 34.50 |

Lens Unit Data

| unit | starting surface | focal length |
|---|---|---|
| 1 | 1 | 81.16 |
| 2 | 13 | −253.85 |

Fifth Numerical Example

Unit: mm

Surface Data

| surface number | r | d | nd | vd |
|---|---|---|---|---|
| 1 | 160.786 | 3.28 | 1.61800 | 63.4 |
| 2 | −246.681 | 0.44 | | |
| 3 | 47.383 | 2.54 | 1.61800 | 63.4 |
| 4 | 73.887 | 10.79 | | |
| 5 | 35.467 | 3.79 | 1.59282 | 68.6 |
| 6 | 124.087 | 2.75 | | |
| 7 | −111.848 | 1.13 | 1.64769 | 33.8 |
| 8 | 34.390 | 4.52 | | |
| 9 (aperture stop) | ∞ | 2.29 | | |
| 10 | 178.572 | 1.14 | 1.84666 | 23.8 |
| 11 | 36.744 | 4.69 | 1.91082 | 35.3 |
| 12 | −68.645 | (variable) | | |
| 13 | −79.997 | 1.04 | 1.72047 | 34.7 |
| 14 | 49.549 | 0.50 | | |
| 15 | 74.169 | 1.92 | 1.83481 | 42.7 |
| 16 | −1706.731 | 2.17 | | |
| 17 | −160.149 | 1.99 | 1.95906 | 17.5 |
| 18 | −51.113 | 1.24 | | |
| 19 | −56.641 | 0.94 | 1.73800 | 32.3 |
| 20 | 56.641 | 5.67 | | |
| 21 | 50.199 | 9.35 | 1.83481 | 42.7 |
| 22 | −55.426 | 10.90 | | |
| 23 | −32.731 | 1.60 | 1.84666 | 23.8 |
| 24 | −91.287 | 17.89 | | |
| image plane | ∞ | | | |

| | |
|---|---|
| focal length | 70.50 |
| F-number | 2.06 |
| half field angle (°) | 17.06 |
| image height | 21.64 |
| overall lens length | 94.86 |
| BF | 17.89 |

| imaging magnification | infinity | −0.02 times | −0.5 times |
|---|---|---|---|
| d12 | 2.29 | 3.26 | 26.52 |

Lens Unit Data

| unit | starting surface | focal length |
|---|---|---|
| 1 | 1 | 58.45 |
| 2 | 13 | −205.60 |

Sixth Numerical Example

Unit: mm

Surface Data

| surface number | r | d | nd | vd |
|---|---|---|---|---|
| 1 | 98.638 | 4.14 | 1.60311 | 60.6 |
| 2 | −462.266 | 0.50 | | |
| 3 | 47.270 | 3.88 | 1.61800 | 63.4 |
| 4 | 101.424 | 9.55 | | |
| 5 | 36.617 | 4.86 | 1.49700 | 81.5 |
| 6 | 118.189 | 1.26 | | |
| 7 | −787.694 | 1.40 | 1.67270 | 32.1 |
| 8 | 31.304 | (variable) | | |
| 9 (aperture stop) | ∞ | 1.50 | | |
| 10 | 155.305 | 1.40 | 1.84666 | 23.8 |
| 11 | 56.680 | 3.55 | 1.90043 | 37.4 |
| 12 | −103.731 | (variable) | | |
| 13 | −115.478 | 1.20 | 1.72047 | 34.7 |
| 14 | 44.956 | 0.62 | | |
| 15 | 69.158 | 1.82 | 1.83481 | 42.7 |
| 16 | 544.011 | 2.29 | | |
| 17 | −273.933 | 3.19 | 1.92286 | 20.9 |
| 18 | −32.238 | 1.10 | 1.80000 | 29.8 |
| 19 | 53.012 | 8.34 | | |
| 20 | 52.542 | 10.22 | 1.76200 | 40.1 |
| 21 | −56.576 | 12.39 | | |
| 22 | −35.085 | 1.80 | 1.84666 | 23.8 |
| 23 | −85.147 | 16.76 | | |
| image plane | ∞ | | | |

-continued

| Unit: mm | | | |
|---|---|---|---|
| focal length | | 85.00 | |
| F-number | | 2.06 | |
| half field angle (°) | | 14.28 | |
| image height | | 21.64 | |
| overall lens length | | 100.82 | |
| BF | | 16.76 | |
| imaging magnification | infinity | −0.02 times | −1.0 times |
| d8 | 6.77 | 6.77 | 13.11 |
| d12 | 2.29 | 3.18 | 47.29 |

| Lens Unit Data | | |
|---|---|---|
| unit | starting surface | focal length |
| 1 | 1 | 134.28 |
| 2 | 9 | 66.95 |
| 3 | 13 | −134.95 |

The various values in each of the numerical examples are collectively shown in Table 1 below.

TABLE 1

| | first exemplary embodiment | second exemplary embodiment | third exemplary embodiment | fourth exemplary embodiment | fifth exemplary embodiment | sixth exemplary embodiment |
|---|---|---|---|---|---|---|
| f1 | 66.726 | 66.738 | 64.443 | 81.159 | 58.447 | 61.418 |
| f2 | −165.056 | −206.885 | −154.721 | −253.853 | −205.596 | −134.950 |
| Dn | 17.597 | 16.835 | 14.924 | 24.999 | 17.888 | 16.756 |
| DL | 104.874 | 98.500 | 102.082 | 118.380 | 94.856 | 100.823 |
| f | 82.450 | 82.480 | 82.500 | 99.800 | 70.500 | 85.000 |
| β | −0.500 | −0.500 | −0.500 | −0.500 | −0.500 | −1.000 |
| Da | 72.668 | 62.032 | 68.998 | 73.905 | 65.617 | 68.464 |
| f2p | 35.571 | 35.611 | 38.574 | 42.116 | 32.878 | 37.260 |
| f1a | 291.733 | 128.854 | 116.765 | 195.859 | 248.791 | 134.279 |
| f1b | 55.085 | 78.098 | 87.198 | 76.360 | 51.280 | 66.946 |
| skd | 17.597 | 16.835 | 14.924 | 21.992 | 17.888 | 16.756 |
| fn | −63.316 | −77.126 | −67.599 | −62.271 | −61.033 | −71.662 |
| inequality (1) | 0.404 | 0.323 | 0.417 | 0.320 | 0.284 | 0.455 |
| inequality (2) | 0.168 | 0.171 | 0.146 | 0.211 | 0.189 | 0.166 |
| inequality (3) | 0.500 | 0.399 | 0.533 | 0.393 | 0.343 | 0.630 |
| inequality (4) | 0.500 | 0.500 | 0.500 | 0.500 | 0.500 | 1.000 |
| inequality (5) | 0.809 | 0.809 | 0.781 | 0.813 | 0.829 | 0.723 |
| inequality (6) | 0.693 | 0.630 | 0.676 | 0.624 | 0.692 | 0.679 |
| inequality (7) | 0.431 | 0.432 | 0.468 | 0.422 | 0.466 | 0.438 |
| inequality (8) | 5.296 | 1.650 | 1.339 | 2.565 | 4.852 | 2.006 |
| inequality (9) | 0.168 | 0.171 | 0.146 | 0.186 | 0.189 | 0.166 |
| inequality (10) | 0.768 | 0.935 | 0.819 | 0.624 | 0.866 | 0.843 |
| inequality (11) | 1.272 | 1.194 | 1.237 | 1.186 | 1.345 | 1.186 |

[Imaging Apparatus]

Figure 13:
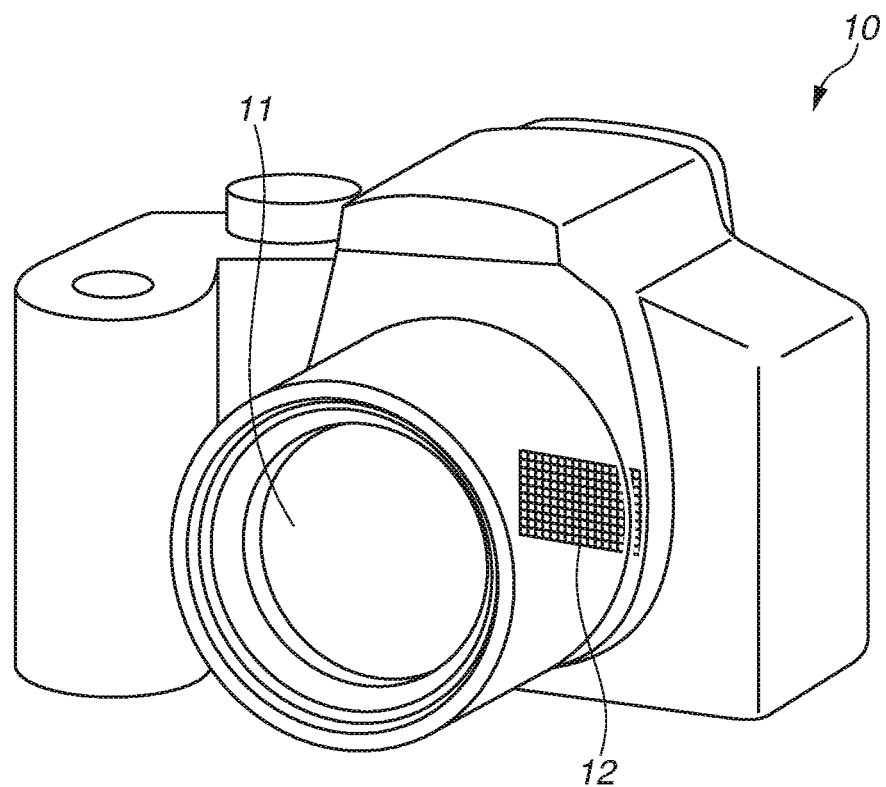
FIG. 13 is a schematic view of an imaging apparatus.

An exemplary embodiment of a digital still camera (imaging apparatus) using the optical system according to the exemplary embodiment of the disclosure as an imaging optical system will be described with reference to FIG. 13. FIG. 13 illustrates a camera body 10, and an imaging optical system 11 including any one of the optical systems described in the first to sixth exemplary embodiments. A solid-state image sensor (photoelectric conversion device) 12 such as a CCD sensor or a CMOS sensor, which is built in the camera body 10, receives an optical image formed by the imaging optical system 11 to photoelectrically convert the optical image. The camera body 10 can be a single-lens reflex camera having a quick turn mirror, or a mirrorless camera having no quick turn mirror.

As described above, by applying the optical system according to the exemplary embodiments of the disclosure to the imaging apparatus such as the digital still camera, it is possible to obtain the imaging apparatus that has high optical performance while being compact.

Although the exemplary embodiments of the disclosure have been described above, the disclosure is not limited to these embodiments and exemplary embodiments, and various combinations, modifications and changes can be made within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-161981, filed Sep. 5, 2019, which is hereby incorporated by reference herein in its entirety.

What is claimed is:

1. An optical system comprising:
   a front lens group consisting of at least one lens unit that moves during focusing, the front lens group having a positive refractive power; and
   a rear lens group consisting of a lens unit that is immobile during focusing and arranged at an image side of the front lens group, the rear lens group having a negative refractive power,
   wherein an interval between adjacent lens units changes during focusing,
   wherein the rear lens group includes at least two negative lenses and a positive lens, and
   wherein the following inequalities are satisfied:

$0.01 < |f1/f2| < 0.70$, $0.00 < Dn/DL < 0.23$, and $0.95 < DL/f < 1.50$, where f1 is a focal length of the front lens group in focusing at infinity, f2 is a focal length of the rear lens group, Dn is a distance on an optical axis to an image plane from a negative lens Gn arranged closest to an image among the at least two negative lenses in the rear lens group, DL is a distance on the optical axis to the image plane from a surface of the optical system, the surface being closest to an object in focusing at infinity, and f is a focal length of the optical system in focusing at infinity.

2. The optical system according to claim 1, wherein the following inequality is satisfied:

$$0.00<|f1/f2|<1.00.$$

3. The optical system according to claim 1, wherein the following inequality is satisfied:

$$|\beta|>0.30,$$

where β is an image magnification of the optical system in focusing at a shortest distance.

4. The optical system according to claim 1, wherein the following inequality is satisfied:

$$0.30<f1/f<1.00.$$

5. The optical system according to claim 1, wherein the front lens group includes an aperture stop.

6. The optical system according to claim 5, wherein the following inequality is satisfied:

$$0.30<Da/DL<0.90,$$

where Da is a distance on the optical axis from the aperture stop to the image plane in focusing at infinity.

7. The optical system according to claim 5, wherein the front lens group includes a first part optical system consisting of all lenses arranged at an object side of the aperture stop in the front lens group and a second part optical system consisting of all lenses arranged at the image side of the aperture stop in the front lens group, and wherein the following inequality is satisfied:

$$0.05<f1a/f1b<8.00,$$

where f1a is a focal length of the first part optical system and f1b is a focal length of the second part optical system.

8. The optical system according to claim 7, wherein the second part optical system includes one positive lens and one negative lens.

9. The optical system according to claim 1, wherein the rear lens group includes a positive lens Gp that is arranged adjacent to the negative lens Gn at an object side, and wherein the following inequality is satisfied:

$$0.00<f2p/f<0.80,$$

where f2p is a focal length of the positive lens.

10. The optical system according to claim 1, wherein the following inequality is satisfied:

$$0.01<skd/DL<0.40,$$

where skd is a distance on the optical axis from a lens surface closest to an image of the optical system to the image plane.

11. The optical system according to claim 1, wherein the following inequality is satisfied:

$$0.05<|fn/f|<1.20,$$

where fn is a focal length of the negative lens Gn.

12. The optical system according to claim 1, wherein the rear lens group includes a single lens element with a negative refractive power or a cemented lens with a negative refractive power, which is arranged closest to the object in the rear lens group.

13. The optical system according to claim 1, wherein the front lens group is composed of one lens unit that integrally moves during focusing.

14. The optical system according to claim 1, wherein the front lens group includes a positive lens arranged closest to the object in the front lens group.

15. An imaging apparatus comprising:

an optical system; and an image sensor configured to photoelectrically convert an optical image formed by the optical system, wherein the optical system comprises:

a front lens group consisting of at least one lens unit that moves during focusing, the front lens group having a positive refractive power; and a rear lens group consisting of a lens unit that is immobile during focusing and arranged at an image side of the front lens group, the rear lens group having a negative refractive power, wherein an interval between adjacent lens units changes during focusing, wherein the rear lens group includes at least two negative lenses and a positive lens, and wherein the following inequalities are satisfied:

$$0.01<|f1/f2|<0.70,$$

$$0.00<Dn/DL<0.23, \text{ and}$$

$$0.95<DL/f<1.50,$$

where f1 is a focal length of the front lens group in focusing at infinity, f2 is a focal length of the rear lens group, Dn is a distance on an optical axis to an image plane from a negative lens arranged closest to an image among the negative lenses in the rear lens group, DL is a distance on the optical axis to the image plane from a surface of the optical system, the surface being closest to an object in focusing at infinity, and f is a focal length of the optical system in focusing at infinity.

16. The imaging apparatus according to claim 15, wherein the following inequality is satisfied:

$$0.00<|f1/f2|<1.00.$$

17. The imaging apparatus according to claim 15, wherein the following inequality is satisfied:

$$|\beta|>0.30,$$

where β is an image magnification of the optical system in focusing at a shortest distance.

18. The imaging apparatus according to claim 15, wherein the following inequality is satisfied:

$$0.30<f1/f<1.00.$$

19. The imaging apparatus according to claim 15, wherein the front lens group includes an aperture stop.

20. The imaging apparatus according to claim 15, wherein the following inequality is satisfied:

$$0.01<skd/DL<0.40,$$

where skd is a distance on the optical axis from a lens surface closest to an image of the optical system to the image plane.

* * * * *